(12) United States Patent
Couto Maquieira et al.

(10) Patent No.: US 10,309,435 B2
(45) Date of Patent: Jun. 4, 2019

(54) POSITIONING DEVICES WITH TOLERANCE COMPENSATION, A SET OF AUTOMOTIVE COMPONENTS COMPRISING SUCH A DEVICE AND A POSITIONING METHOD WITH TOLERANCE COMPENSATION

(71) Applicant: MGI COUTIER ESPANA SL, Vigo, Pontevedra (ES)

(72) Inventors: Javier Couto Maquieira, Vigo (ES); José Manuel Fernandez Estevez, Vigo (ES); Javier Casal Gomez, Vigo (ES); Mauricio Canosa Carril, Pontevedra (ES)

(73) Assignee: MGI COUTIER ESPANA SL, Vigo (ES)

( * ) Notice: Subject to any disclaimer, the term of this patent is extended or adjusted under 35 U.S.C. 154(b) by 333 days.

(21) Appl. No.: 15/216,051

(22) Filed: Jul. 21, 2016

(65) Prior Publication Data

US 2017/0045066 A1 Feb. 16, 2017

(30) Foreign Application Priority Data

Jul. 21, 2015 (FR) ...................................... 15 56878

(51) Int. Cl.
 *F16B 35/00* (2006.01)
 *F16B 5/02* (2006.01)
(52) U.S. Cl.
 CPC ............ *F16B 5/0216* (2013.01); *F16B 5/025* (2013.01); *F16B 5/0233* (2013.01)
(58) Field of Classification Search
 CPC ....... F16B 5/0216; F16B 5/0233; F16B 5/025

(Continued)

(56) References Cited

U.S. PATENT DOCUMENTS

| 4,304,503 A * | 12/1981 | Gehring | F16B 35/04 |
| | | | 29/525.04 |
| 4,690,365 A * | 9/1987 | Miller | F16B 5/0233 |
| | | | 248/188.4 |

(Continued)

FOREIGN PATENT DOCUMENTS

| DE | 20204994 U1 | 7/2002 |
| DE | 102005029529 A1 | 1/2007 |
| DE | 102013014760 A1 | 3/2015 |

*Primary Examiner* — Gary W Estremsky
(74) *Attorney, Agent, or Firm* — Oliff PLC

(57) ABSTRACT

A positioning device with tolerance compensation including: a screw; a primary tightening member, and a secondary nut. The screw includes a driving portion cooperating with a driving tool to rotatably drive the screw and is located in an axial end portion of the screw; primary and secondary external threads, the primary external thread being further from the driving portion than the secondary external thread, the directions of the secondary external thread and the primary external thread are opposing; and an abutment projecting between the primary and secondary external threads. The primary tightening member includes a primary internal thread adapted to cooperate with the primary external thread, the primary tightening member and the abutment secured to an intermediate component. The secondary nut includes a secondary internal thread cooperating with the secondary external thread and is configured to bear against the intermediate component to fasten a first component on a second component.

11 Claims, 4 Drawing Sheets

(58) Field of Classification Search
USPC .................................................. 411/389, 412
See application file for complete search history.

(56) References Cited

U.S. PATENT DOCUMENTS

| | | | | | |
|---|---|---|---|---|---|
| 4,729,707 | A | * | 3/1988 | Takahashi | F16B 35/042 |
| | | | | | 403/45 |
| 4,786,201 | A | * | 11/1988 | Huetter | F16B 12/14 |
| | | | | | 403/22 |
| 5,205,692 | A | * | 4/1993 | Kelbert | F16B 5/0216 |
| | | | | | 411/173 |
| 5,609,454 | A | * | 3/1997 | Lee | F16B 5/0275 |
| | | | | | 411/384 |
| 6,125,526 | A | * | 10/2000 | Wierzchon | F16B 5/0275 |
| | | | | | 29/525.02 |
| 6,406,239 | B1 | * | 6/2002 | Mauri | F16B 7/18 |
| | | | | | 411/178 |
| 7,891,927 | B2 | | 2/2011 | Burger et al. | |

* cited by examiner

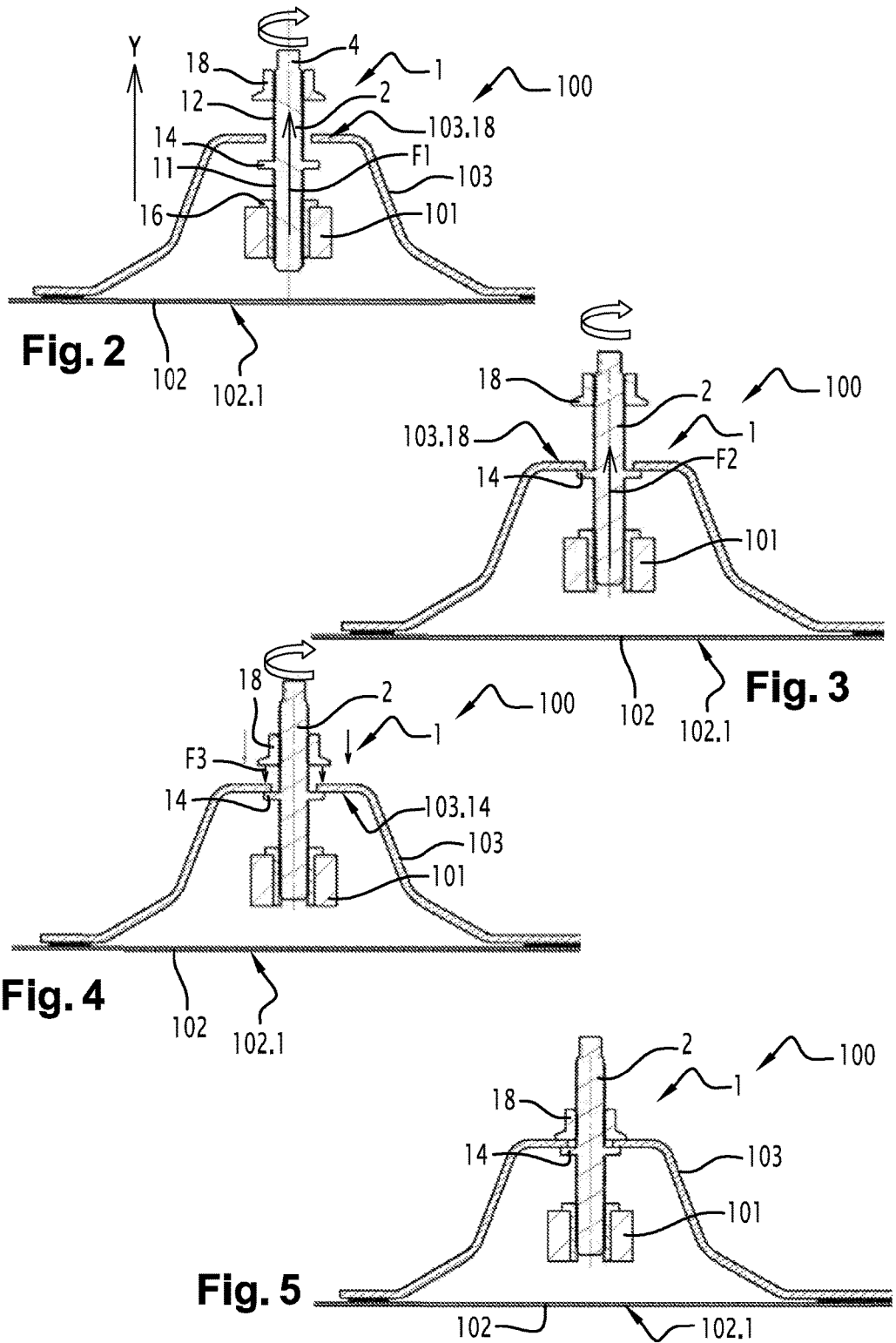

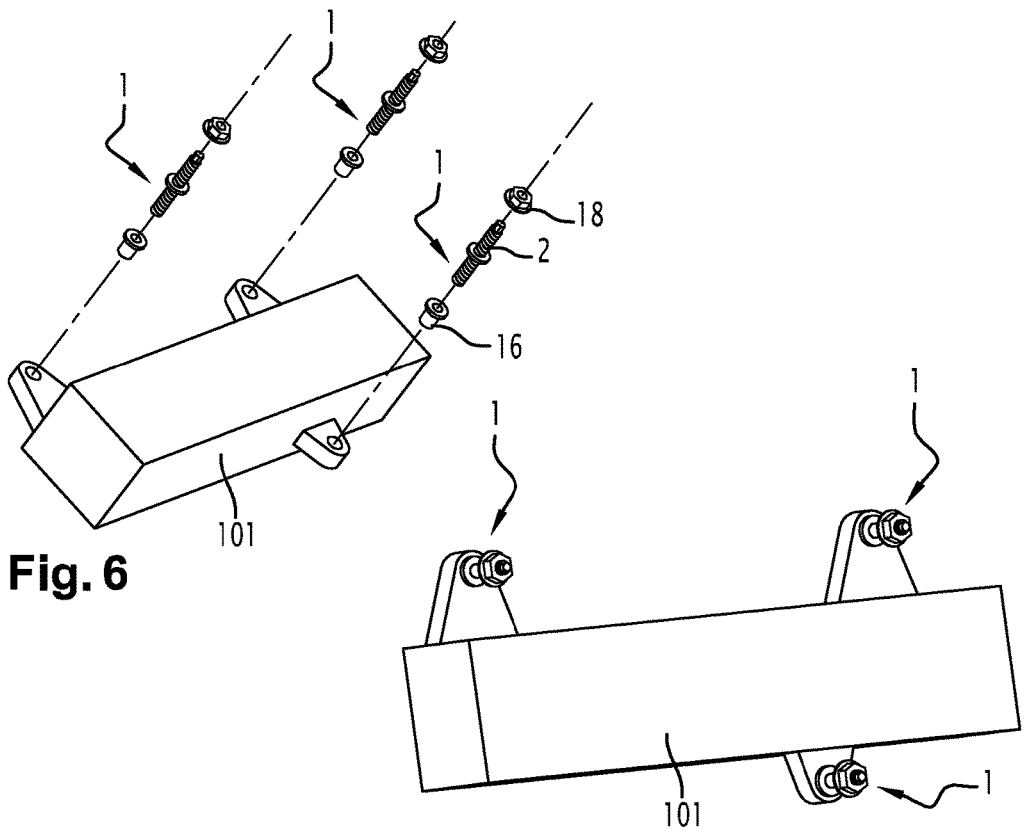
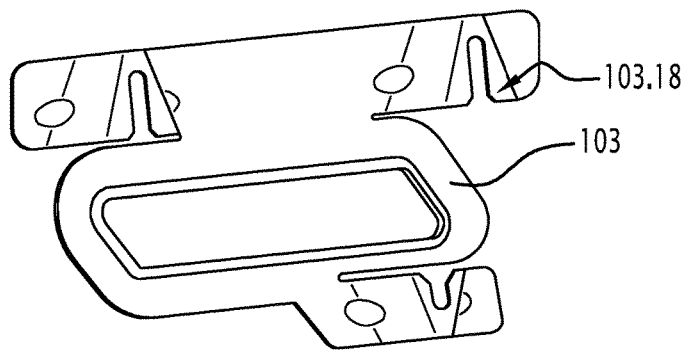

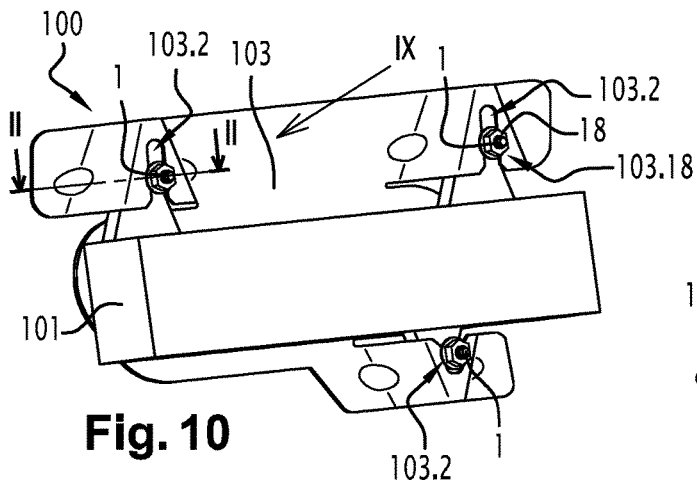
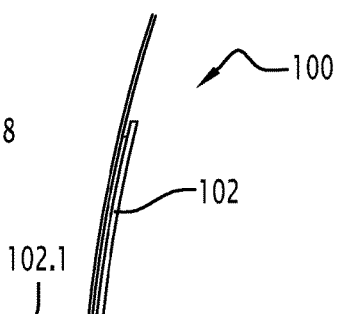
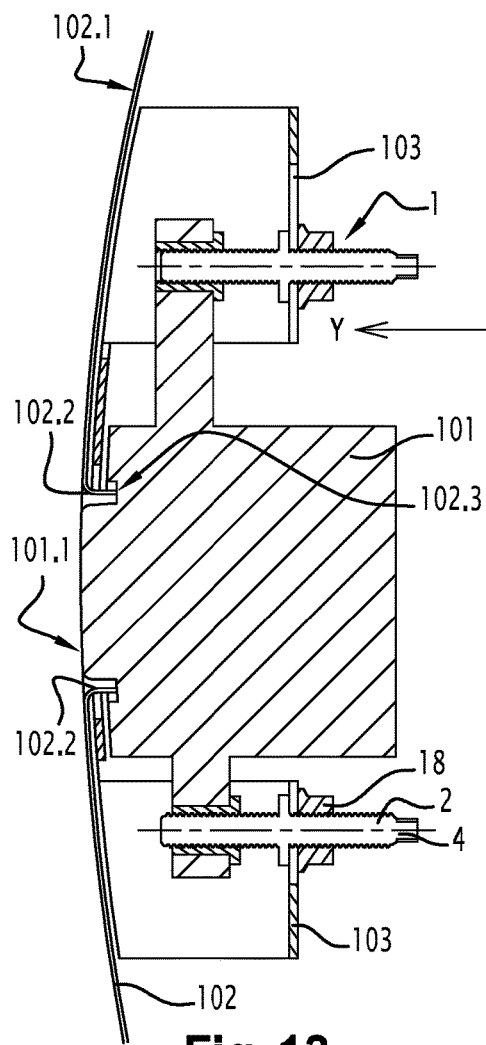
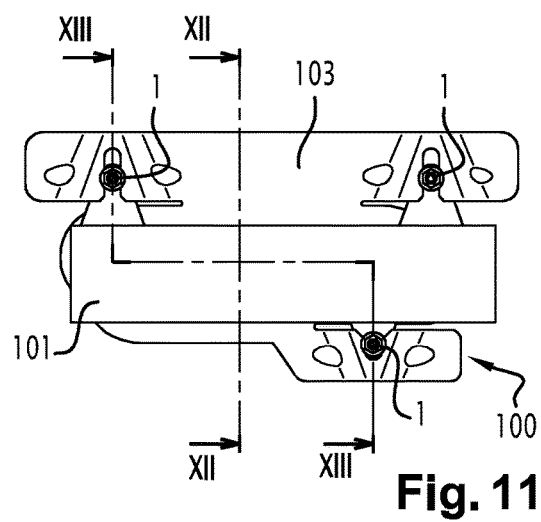

POSITIONING DEVICES WITH TOLERANCE COMPENSATION, A SET OF AUTOMOTIVE COMPONENTS COMPRISING SUCH A DEVICE AND A POSITIONING METHOD WITH TOLERANCE COMPENSATION

The present invention concerns a positioning device with tolerance compensation for positioning a first automotive component with respect to a second automotive component by fastening the first automotive component on an intermediate component. In addition, the present invention concerns a set of automotive components comprising such a positioning device with tolerance compensation. Moreover, the present invention concerns a positioning method with tolerance compensation implementing such a set of automotive components.

The present invention is applied to the field of positioning and fastening the automotive components, in particular the automotive components having a portion visible from the outside of the motor vehicle. By motor vehicle, are meant, in particular, passenger vehicles, commercial vehicles, agricultural machines or industrial vehicles for example of the truck-type.

U.S. Pat. No. 7,891,927 B2 describes a positioning device with tolerance compensation for positioning a first automotive component with respect to a second automotive component. The positioning device with tolerance compensation of U.S. Pat. No. 7,891,927 B2 comprises a screw and an intermediate part having an internal thread cooperating with the screw. The intermediate part further has an (external) thread which is screwed in an insert fixed with respect to the second automotive component. The screwing of the screw and of the intermediate part positions the first automotive component with respect to the second automotive component.

However, the parts of the positioning device with tolerance compensation of U.S. Pat. No. 7,891,927 B2 have complex geometries, which may make these parts difficult to control unit and which imposes to manufacture these parts in plastic. Still, these plastic parts may creep and cannot withstand the considerable forces which are necessary for maintaining a durable and vibration-less fastening. Furthermore, the positioning device of U.S. Pat. No. 7,891,927 B2 requires that the operator makes a position adjustment during the assembly of the set of automotive components.

The present invention aims in particular to solve all or part of the aforementioned problems.

For this purpose, an object of the present invention is a positioning device with tolerance compensation, for positioning a first automotive component with respect to a second automotive component by fastening the first automotive component on an intermediate component, the positioning device with tolerance compensation comprising:

a screw having at least:

one driving portion configured to cooperate with a driving tool so as to rotatably drive the screw, the driving portion being located in an axial end portion of the screw, one primary external thread and one secondary external thread, the primary external thread being further from the driving portion than the secondary external thread, the direction of the secondary external thread being opposite to the direction of the primary external thread, and one abutment extending in projection between the primary external thread and the secondary external thread, a primary tightening member having a primary internal thread adapted to cooperate with the primary external thread, the primary tightening member being intended to be secured to the first automotive component; and a secondary nut having a secondary internal thread adapted to cooperate with the secondary external thread, the secondary nut and the abutment being configured to bear against the intermediate component so as to fasten the first automotive component on the intermediate component.

Thus, such a positioning device with tolerance compensation allows compensating tolerances between the first automotive component and the second automotive component, without the operator having to adjust the position of the first or of the second automotive component. For example, these tolerance compensations allow making a first outer surface of the first automotive component flush with a second outer surface of the second automotive component, which improves the aspect of the motor vehicle.

In other terms, the positioning device allows guaranteeing an optimal, for example perfectly flushing, positioning of the first automotive component relative to the second automotive component. Indeed, the positioning device compensates the geometrical variations induced by the dispersions of manufacture of the intermediate component.

Indeed, since the primary and secondary external threads are in opposite directions, during the fastening, the rotation of the screw starts by displacing the primary external thread in the primary internal thread. Then, the screw comes out from the primary internal thread until the abutment abuts against an abutment portion of the intermediate component. Afterwards, the secondary nut is rotated until bearing against the intermediate component.

Hence, the primary automotive component is displaced relative to the second automotive component until the primary automotive component is docked against an abutment portion of the intermediate component. Then, the primary external thread starts to be tensioned (tightened). Afterwards, when the tension is such that the frictional torque between the abutment and the abutment portion is higher than the torque between the secondary nut and the secondary external thread, the rotation of the screw stops, then the secondary nut starts to rotate and to move on the secondary external thread. When the nut is docked against the abutment portion of the intermediate component, the first automotive component is firmly fastened to the intermediate component and the first automotive component is properly positioned with respect to the second automotive component.

According to one embodiment, the primary external thread, the secondary external thread, the primary internal thread and the secondary internal thread are configured so that a secondary torque induced by the frictions between the secondary external thread and the secondary internal thread is higher than a primary torque induced by the frictions between the primary external thread and the primary internal thread.

Thus, such primary and secondary torques allow an operator to rotatably drive the screw by making the secondary nut rotate as long as the abutment does not bear against an abutment portion of the intermediate component. Since the secondary torque is higher than the primary torque, it is the primary external thread that rotates in the primary internal thread. Then, after the abutment bears against the first automotive component, the secondary torque makes the secondary nut rotate around the secondary external thread, because the abutment prevents the rotation of the screw relative to the primary tightening member.

According to one embodiment, the positioning device with tolerance compensation further comprises a coating product disposed between the secondary external thread and the internal thread.

Thus, such a coating product allows obtaining a secondary torque higher than the primary torque. For example, the coating product may be of the trademark Tuflok®.

Alternatively to this embodiment, the secondary nut may be a secondary self-locking nut, for example a nut of the trademark Nylstop®.

Still alternatively, at least one among the secondary external thread and the secondary internal thread has deformed threads, for example with cuts or with a slight crushing. Thus, such deformed threads allow increasing friction in the connection between the secondary external thread and the secondary internal thread.

According to one embodiment, the primary tightening member is formed by an insert configured to be secured to the first automotive component.

Thus, such an insert may be placed in a bore and secured to the first automotive component.

Alternatively to this embodiment, the primary tightening member may be formed by a tightening portion of the first automotive component. This tightening portion may be integral with the first automotive component. For example, the first automotive component is provided with the primary internal thread.

According to one embodiment, the secondary external thread extends from the driving portion to the abutment, and the primary external thread extends from the abutment to an end portion of the screw opposite to the driving portion.

In other words, the primary external thread and the secondary external thread completely cover the screw, with the exception of the tightening portion and the abutment. Thus, the screw may be relatively compact, because its rod is devoid of a smooth portion.

According to one embodiment, the abutment is located substantially at the middle of the screw along an axial direction.

Thus, such a position of the abutment confers a relatively wide range of tolerance compensation to the positioning device with tolerance compensation. Hence, the positioning device with tolerance compensation is suitable for assembling various automotive components.

According to one variant, the abutment surrounds at least partially the screw, the abutment having generally the shape of a ring.

According to one variant, the abutment partially surrounds the screw, the abutment having generally the shape of an open ring. Alternatively to this variant, the abutment completely surrounds the screw, the abutment having generally the shape of a closed ring.

According to one variant, the abutment is integral with the rod of the screw including the secondary external thread and the primary external thread. Alternatively, the abutment may be secured to the rod of the screw.

According to one variant, at least one face of the abutment is covered with reliefs, for example braking teeth, configured to rub against a complementary portion of the first and/or of the intermediate component.

According to one embodiment, the secondary external thread is dextral and the primary external thread is sinistral.

In other words, the secondary external thread has a right-hand pitch which is tightened by rotating clockwise, and the primary external thread has a left-hand pitch which is tightened by rotating counterclockwise. Thus, since the secondary external thread has a dextral pitch, the rotation driving of the screw is intuitive for an operator.

Alternatively, the secondary external thread may be sinistral and the primary external thread may be dextral.

According to one variant, the driving portion has a male shape. Thus, such a driving portion is relatively compact.

According to one variant, the driving portion has an external hexagonal shape, for example of the type known by the name «Allen». According to another variant, the driving portion has an external hexalobular shape, for example of the type known by the trade name «Torx®».

Alternatively to this embodiment, the driving portion may have any other shape, for example a female shape, allowing a rotation driving of the screw.

In addition, an object of the present invention is a set of automotive components, for equipping a motor vehicle, the set of automotive components comprising at least:

a first automotive component defining a portion of the outer surface of the motor vehicle, a second automotive component defining a portion of the outer surface of the motor vehicle, and an intermediate component configured to support the first automotive component, the set of automotive components being characterized in that it further comprises at least one positioning device with tolerance compensation according to the invention, the positioning device with tolerance compensation being arranged so as to fasten the first automotive component to the intermediate component.

Thus, such a set of automotive components fits properly. For example, a first outer surface of the first automotive component may flush with a second outer surface of the second automotive component, which improves the aspect of the motor vehicle.

According to one variant:

the first automotive component is selected in the group constituted of an energy trapdoor, a door external opening control unit, a door internal opening control unit, an interior lining element, a light projector casing, a rear-trunk external opening control unit, a hood external opening control unit, an exterior lining element mounted from the inside of a door or of the body to the outside of the motor vehicle, an interior lining element mounted from the inside of a body panel or of a trim or of a dashboard to the inside of a motor vehicle, a radiator grille, a decorative element, a chrome strip, a body protector and a rear-view mirror, and the second automotive component is selected in the group constituted of an internal panel, an external panel, a portion of the external skin of the motor vehicle and a portion of the internal skin of the motor vehicle.

According to one variant, the set of automotive components comprises at least two positioning devices with tolerance compensation according to the invention, the positioning devices with tolerance compensation being disposed on respective sides of the first automotive component. Thus, these positioning devices with tolerance compensation allow compensating tolerances in order to optimize the aspect in several areas of the first automotive component.

According to one embodiment, the second automotive component and the intermediate component form a single part.

Thus, such a single part facilitates the assembly of the set of automotive components and simplifies the management of the stocks of automotive components. For example, the single part may be a door of a motor vehicle which is composed of a composite material and which is produced by molding.

Moreover, an object of the present invention is a positioning method with tolerance compensation, for positioning a first automotive component with respect to a second automotive component by fastening the first automotive component on an intermediate component, the positioning method with tolerance compensation comprising the steps of:

providing a set of automotive components according to the invention in a disassembled state, the or each primary external thread being engaged in a respective primary internal thread, connecting the first automotive component to the intermediate component by means of said at least one positioning device, rotatably driving the screw so that the driving portion is pulled away from the primary tightening member until the abutment cooperates with the abutment portion, rotatably driving the screw so that the screw displaces the first automotive component relative to the second automotive component, and rotatably driving the secondary nut relative to the secondary external thread until the secondary nut presses against the intermediate component so as to fasten the first automotive component to the intermediate component.

Thus, such a positioning method with tolerance compensation allows positioning the first automotive component accurately with respect to the second automotive component, therefore optimizing the aspect, and firmly fastening the first automotive component to the intermediate component. In this case, the secondary nut achieves a tightening function for fastening the first automotive component to the intermediate component.

According to one variant, the positioning method further comprises a step of setting the first automotive component in a reference position against the second automotive component. Thus, the step consisting in setting the first automotive component in the reference position against the second automotive component frees the operator from adjusting the position of the first automotive component with respect to the second automotive component.

According to one embodiment, each step of rotatably driving the screw comprises an engagement step for engaging a driving tool on the secondary nut.

In this embodiment, a coating product may be disposed between the secondary external thread and the secondary internal thread, so as to maintain the secondary nut on the secondary external thread.

Alternatively to this embodiment, the step of rotatably driving the screw comprises a step of engaging a driving tool on the driving portion. In this variant, the secondary nut only achieves the tightening function for fastening the first automotive component to the intermediate component.

According to one embodiment, the step of rotatably driving the secondary nut is performed until the abutment exerts on the intermediate component an adhesion torque higher than the secondary torque.

Thus, this adhesion torque induces the rotation of the secondary nut relative to the secondary external thread, including in the variant comprising a coating product disposed between the secondary nut and the secondary external thread.

The embodiments and the variants mentioned hereinbefore may be considered separately or according to any technically possible combination.

The present invention will be better understood and its advantages will appear in the light of the description that will follow, given only as a non-limiting example and made with reference to the appended schematic figures, in which identical reference numerals correspond to structurally and/or functionally identical or similar elements. In the appended schematic figures:

FIG. 2 is a schematic sectional view of a portion of a set of automotive components in accordance with the invention and comprising the positioning device with tolerance compensation of FIG. 1, during a step of a positioning method with tolerance compensation in accordance with the invention;

FIG. 3 is a view similar to FIG. 2, during a subsequent step of the positioning method with tolerance compensation;

FIG. 4 is a view similar to FIG. 2, during a subsequent step of the positioning method with tolerance compensation;

FIG. 5 is a view similar to FIG. 2, during a subsequent step of the positioning method with tolerance compensation;

FIG. 6 is an exploded perspective view of a first automotive component and of three positioning devices with tolerance compensation according to FIG. 1;

FIG. 7 is an assembled perspective view of the first automotive component and of the three positioning devices with tolerance compensation of FIG. 6;

FIG. 8 is a perspective view of a portion of the intermediate component;

FIG. 9 is a perspective view of the second automotive component and of the intermediate component illustrated in FIG. 8;

FIG. 10 is a perspective view of the first automotive component and of the intermediate component fastened by the three positioning devices with tolerance compensation of FIG. 6; FIG. 2 corresponds to a section along the line II in FIG. 10;

FIG. 11 is a front view of the first automotive component and of the intermediate component fastened by the three positioning devices with tolerance compensation of FIG. 6;

FIG. 12 is a section along the line XII-XII in FIG. 11;

FIG. 13 is a section along the broken line XIII-XIII in FIG. 11, illustrating the set of automotive components of FIG. 5.

Figure 1:
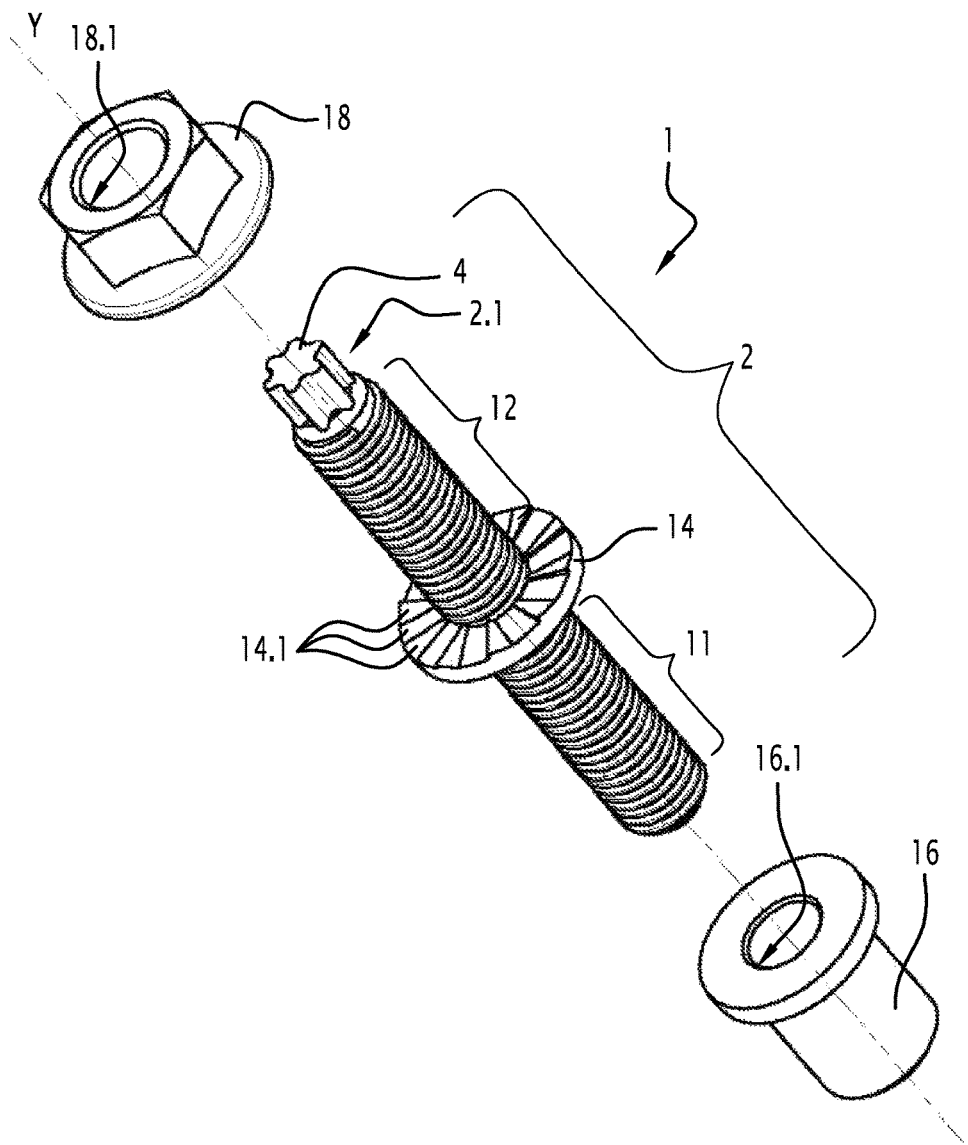
FIG. 1 is a perspective view of a positioning device with tolerance compensation in accordance with the invention.

FIG. 1 illustrates a positioning device 1 with tolerance compensation. As shown in FIGS. 2 to 5, the positioning device 1 with tolerance compensation is intended to position a first automotive component 101 with respect to a second automotive component 102. In addition, the positioning device 1 with tolerance compensation is intended to fasten the first automotive component 101 to an intermediate component 103.

The positioning device 1 with tolerance compensation comprises a screw 2, a primary tightening member 16, a secondary nut 18.

The screw 2 has a driving portion 4, a primary external thread 11, a secondary external thread 12 and an abutment 14.

The abutment 14 extends in projection between the primary external thread 11 and the secondary external thread 12. The abutment 14 herein is located substantially at the middle of the screw 2 along an axial direction Y. The abutment 14 herein completely surrounds the screw 2. The abutment 14 has generally the shape of a closed ring.

The abutment 14 herein is integral with the rod of the screw 2. A face of the abutment 14 is covered with reliefs 14.1, herein braking teeth, configured to rub against a complementary portion of the intermediate component 103.

The driving portion 4 is configured to cooperate with a driving tool, not represented, so as to rotatably drive the screw 2 about the screw axis Y. The driving portion 4 is located in an axial end portion 2.1 of the screw 2. The driving portion 4 herein has a male shape. The driving portion 4 herein has an external hexalobular shape.

The primary external thread 11 is further from the driving portion 4 than the secondary external thread 12. In the example of the figures, the secondary external thread 12 extends from the driving portion 4 to the abutment 14, and the primary external thread 11 extends from the abutment 14 to an end portion of the screw 2 opposite to the driving portion 4.

The direction of the primary external thread 11 is opposite to the direction of the secondary external thread 12. In this instance, the secondary external thread 12 is dextral and the primary external thread 11 is sinistral.

The secondary nut 18 and the abutment 14 respectively are configured to bear against the intermediate component 103 so as to fasten the first automotive component 101 on the intermediate component 103.

The secondary nut 18 has a secondary internal thread 18.1 which is adapted to cooperate with the secondary external thread 12. The secondary nut 18 is configured to bear against a planar portion 103.18 of the intermediate component 103.

The primary tightening member 16 has a primary internal thread 16.1 which is adapted to cooperate with the primary external thread 11. The primary tightening member 16 is intended to be secured to the first automotive component 101. The primary tightening member 16 herein is formed by an insert secured to the first automotive component 101, as shown in FIGS. 2 to 5.

The primary external thread 11, the secondary external thread 12, the primary internal thread 16.1 and the secondary internal thread 18.1 are configured so that a secondary torque induced by the frictions between the secondary external thread 12 and the secondary internal thread 18.1 is higher than a primary torque induced by the frictions between the primary external thread 11 and the primary internal thread 16.1.

To this end, in the example of the figures, the positioning device 1 with tolerance compensation further comprises a coating product disposed between the secondary external thread 12 and the secondary internal thread 18.1.

Figure 14:
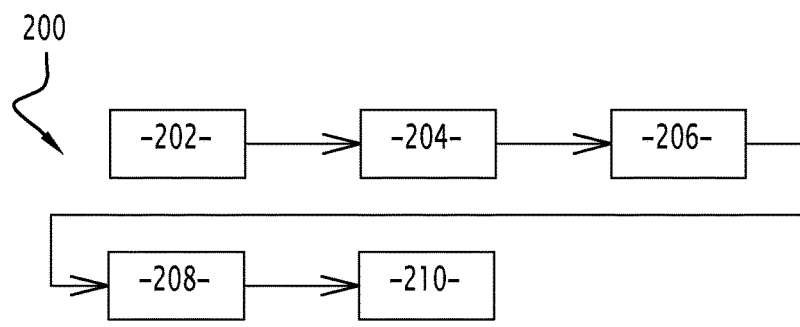
FIG. 14 is a flow chart illustrating a positioning method with tolerance compensation in accordance with the invention.

FIGS. 2 to 13 illustrate a set of automotive components 100 for equipping a motor vehicle, as well as steps of a positioning method 200 with tolerance compensation, schematized in FIG. 14.

The set of automotive components 100 comprises a first automotive component 101, a second automotive component 102, an intermediate component 103 and the positioning device 1 with tolerance compensation of FIG. 1.

In the example of FIGS. 2 to 13, the first automotive component 101 is a door external opening control unit. The second automotive component is a sheet metal body panel which supports the door external opening control unit. The intermediate component 103 is configured to support the first automotive component 101. The intermediate component 103 herein is formed by a folded sheet metal bracket. The intermediate component 103 is secured to the second automotive component 102, in this instance by bonding or welding.

When the set of automotive components 100 is in an assembled state, the door external opening control unit flushes with a body panel through an opening 102.5. The body panel defines a portion of the outer surface 103 of the motor vehicle, as shown in FIGS. 12 and 13.

The first automotive component 101 comprises a first outer surface 101.1, which is visible in FIGS. 12 and 13 and which defines a portion of the outer surface of the motor vehicle which is not represented. The second automotive component 102 comprises a second outer surface 102.1, which is visible in FIGS. 12 and 13 and which defines a portion of the outer surface of the motor vehicle.

The intermediate component 103 is partially arranged inside the motor vehicle. The intermediate component 103 comprises an abutment portion 103.14 which is configured to cooperate with the abutment 14 when the driving portion 4 is pulled away from the primary tightening member 16. In the position of FIG. 5, the abutment portion 103.14 cooperates with the abutment 14.

When the positioning device 1 with tolerance compensation is in use for fastening a set of automotive components 100, the positioning method 200 is carried out, by performing the following steps:

Step 202: An operator provides the set of automotive components 100. In this set of automotive components 100, each primary external thread 11 is engaged in a respective primary internal thread 16.1. Then, the operator places each positioning device 1 between the first automotive component 101 and the intermediate component 103 via a tilt-up movement by means of notches 103.2 defined on the intermediate component 103, as shown in FIG. 10.

Step 204: The operator connects the first automotive component 101 to the intermediate component 103 by means of the positioning devices 1. The set of automotive components 100 is then in the state illustrated in FIG. 10.

Step 205: In the example of the figures, the operator sets the first automotive component 101 in the reference position against the second automotive component 102. In the example of FIG. 13, the operator presses the first automotive component 101 against an abutment surface 102.3 of the second automotive component 102. The abutment surface 102.3 herein is formed by a flanged edge 102.2 delimiting the opening 102.5 through the sheet metal body panel. Thus, the operator has no position adjustment to perform in order to position the first automotive component 101 with respect to the second automotive component 102.

Step 206: The operator rotatably drives the screw 2 so that the driving portion 4 is pulled away from the primary tightening member 16, as shown by the arrow F2 in FIG. 3, until the abutment 14 cooperates with the abutment portion 103.14. The set of automotive components 100 is then in the state illustrated in FIG. 3.

Step 208: The operator rotatably drives the screw 2 so that the screw 2 displaces the first automotive component 101 relative to the second automotive component 102 along the direction of the arrows F2 in FIG. 4.

Subsequently to step 208, the first automotive component 101 is held pressed between each abutment portion 103.14 and a reference surface of the second automotive component 102. Consequently, the first outer surface 101.1 and the second outer surface 102.1 are almost coincident, which ensures a flushing, that is to say a clearance 101.102 close to 0 mm and an excellent aspect of the set of automotive components 100.

Step 210: The operator rotatably drives the secondary nut 18 relative to the secondary external thread 12, so as to bring the nut close to the intermediate component 103 along the arrow F3, until the secondary nut 18 presses against the planar portion 103.18 of the intermediate component 103, as shown in FIGS. 4 and 5.

In this step 210 of rotatably drive the secondary nut 18, the operator tightens the secondary nut 18 until the abutment 14 exerts on the intermediate component 103 an adhesion torque higher than the secondary torque. Thus, this adhesion torque induces the rotation of the secondary nut 18 relative to the secondary external thread 12. The first automotive component 101 is then fastened to the intermediate component 103, in the state illustrated in FIGS. 5, 10 and 11.

Each of the rotation driving steps 208 and 210 comprises an engagement step for engaging a driving tool on the primary nut 16 in order to rotate the screw 2.

Of course, the present invention is not limited to the particular embodiments described in the present patent application, nor is it limited to embodiments within the reach of those skilled in the art. Other embodiments may be considered without departing from the scope of the invention, from any element equivalent to an element indicated in the present patent application.

The invention claimed is:

1. A positioning device with tolerance compensation, for positioning a first automotive component with respect to a second automotive component by fastening the first automotive component on an intermediate component, the positioning device with tolerance compensation comprising:
   a screw having at least:
      one driving portion configured to cooperate with a driving tool so as to rotatably drive the screw, the driving portion being located in an axial end portion of the screw,
      one primary external thread and one secondary external thread, the primary external thread being further from the driving portion than the secondary external thread, the direction of the secondary external thread being opposite to the direction of the primary external thread, and
      one abutment extending in protrusion between the primary external thread and the secondary external thread,
   a primary tightening member having a primary internal thread configured to cooperate with the primary external thread, the primary tightening member being intended to be secured to the first automotive component; and
   a secondary nut having a secondary internal thread configured to cooperate with the secondary external thread, the secondary nut and the abutment being configured to bear against the intermediate component so as to fasten the first automotive component on the intermediate component, wherein
   the primary external thread, the secondary external thread, the primary internal thread and the secondary internal thread are configured so that a secondary torque caused by the frictions between the secondary external thread and the secondary internal thread is higher than a primary torque induced by the frictions between the primary external thread and the primary internal thread.

2. The positioning device with tolerance compensation according to claim 1, further comprising a coating product disposed between the secondary external thread and the internal thread.

3. The positioning device with tolerance compensation according to claim 1, wherein the primary tightening member is formed by an insert configured to be secured to the first automotive component.

4. The positioning device with tolerance compensation according to claim 1, wherein the secondary external thread extends from the driving portion to the abutment, and wherein the primary external thread extends from the abutment to an end portion of the screw opposite to the driving portion.

5. The positioning device with tolerance compensation according to claim 1, wherein the abutment is located substantially at the middle of the screw along an axial direction.

6. The positioning device with tolerance compensation according to claim 1, wherein the secondary external thread is dextral and the primary external thread is sinistral.

7. A set of automotive components, for equipping a motor vehicle, the set of automotive components comprising at least:
   a first automotive component defining a portion of the outer surface of the motor vehicle,
   a second automotive component defining a portion of the outer surface of the motor vehicle, and
   an intermediate component configured to support the first automotive component,
   wherein the set of automotive components further comprises at least one positioning device with tolerance compensation according to claim 1, the positioning device with tolerance compensation being arranged so as to fasten the first automotive component to the intermediate component.

8. The set of automotive components according to the claim 7, wherein the second automotive component and the intermediate component form a single part.

9. A positioning method with tolerance compensation, for positioning a first automotive component with respect to a second automotive component by fastening the first automotive component on an intermediate component, the positioning method with tolerance compensation comprising the steps of:
   providing a set of automotive components according to claim 8 in a disassembled state, the or each primary external thread being engaged in a respective primary internal thread,
   connecting the first automotive component to the intermediate component by means of said at least one positioning device,
   rotatably driving the screw so that the driving portion is pulled away from the primary tightening member until the abutment cooperates with the abutment portion,
   rotatably driving the screw so that the screw displaces the first automotive component relative to the second automotive component, and
   rotatably driving the secondary nut relative to the secondary external thread until the secondary nut presses against the intermediate component so as to fasten the first automotive component to the intermediate component.

10. The positioning method with tolerance compensation according to claim 9, wherein each step of rotatably driving the screw comprises an engagement step for engaging a driving tool on the secondary nut.

11. The positioning method with tolerance compensation according to claim 9, wherein the step of rotatably driving the secondary nut is performed until the abutment exerts on the intermediate component an adhesion torque higher than the secondary torque.

* * * * *